US006181375B1

(12) United States Patent
Mitsui et al.

(10) Patent No.: US 6,181,375 B1
(45) Date of Patent: *Jan. 30, 2001

(54) IMAGE RECORDING APPARATUS CAPABLE OF SELECTING PARTIAL IMAGE AREAS FOR VIDEO READOUT

(75) Inventors: Kenji Mitsui, Yokohama; Masataka Tsuji, Kobe, both of (JP)

(73) Assignee: Kabushiki Kaisha Photron, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/769,316

(22) Filed: Dec. 19, 1996

Related U.S. Application Data

(63) Continuation of application No. 08/282,507, filed on Aug. 1, 1994, which is a continuation of application No. 07/915,978, filed on Jul. 21, 1992, now abandoned.

(30) Foreign Application Priority Data

Jul. 22, 1991 (JP) ...................................... 3-181311

(51) Int. Cl.⁷ ........................... H04N 5/262; H04N 5/335
(52) U.S. Cl. ........................ 348/240; 348/206; 348/281; 348/320; 348/322
(58) Field of Search ...................... 348/230, 241, 348/281, 302, 304, 306, 311, 312, 314, 317, 319, 320, 345, 346, 347, 240, 206, 266, 272, 273, 282, 283, 322; H04N 5/335

(56) References Cited

U.S. PATENT DOCUMENTS

| | | | |
|---|---|---|---|
| 3,786,263 | * | 1/1974 | Michon ................................ 250/209 |
| 4,322,638 | | 3/1982 | Lee et al. . |
| 4,322,752 | * | 3/1982 | Bixby .................................... 358/213 |
| 4,330,796 | * | 5/1982 | Anagnostopoulos et al. ........ 358/213 |
| 4,339,775 | | 7/1982 | Lemke et al. .......................... 360/10 |
| 4,539,598 | * | 9/1985 | Dietrich et al. ....................... 348/319 |
| 4,641,199 | * | 2/1987 | Miyagi .................................. 358/285 |
| 4,684,995 | * | 8/1987 | Baumeister ........................... 348/347 |
| 4,785,353 | * | 11/1988 | Seim ..................................... 348/241 |
| 4,827,345 | * | 5/1989 | Nakagawa et al. .............. 358/213.27 |
| 4,910,599 | * | 3/1990 | Hashimoto ............................ 348/240 |
| 4,942,473 | * | 7/1990 | Zeevi ................................ 358/213.26 |
| 5,001,507 | * | 3/1991 | Iida et al. .............................. 396/104 |
| 5,196,939 | * | 3/1993 | Elabd et al. .......................... 348/314 |
| 5,262,871 | * | 11/1993 | Wilder et al. .................... 358/213.11 |
| 5,285,286 | * | 2/1994 | Kannegundla ........................ 348/187 |
| 5,412,422 | * | 5/1995 | Yamada et al. ....................... 348/218 |

FOREIGN PATENT DOCUMENTS

| | | | |
|---|---|---|---|
| 2113949 | * | 1/1982 | (GB) . |
| 2 113 949 | | 8/1982 | (GB) . |

* cited by examiner

Primary Examiner—Wendy Garber
Assistant Examiner—Ngoc-Yen Vu
(74) Attorney, Agent, or Firm—Finnegan, Henderson, Farabow, Garrett & Dunner, L.L.P.

(57) ABSTRACT

In an image recording apparatus, an imaging surface of an image device is formed so as to store and read out an image by arranging two-dimensionally a plurality of photoelectric transfer elements, the imaging surface is divided along lines into a plurality of blocks, scanning lines are formed in accordance with the photoelectric transfer elements arranged in a horizontal direction of the respective divided blocks, and the plurality of scanning lines of the respective blocks are parallelly linearly scanned to output a multichannel video signals. The image recording apparatus comprises a first scanning circuit for setting a plurality of linear scanning direction start positions along the scanning line direction of the blocks and selecting a block to be read out, a second scanning circuit for selecting the linear scanning start positions and numbers of picture elements to be linearly scanned and a drive circuit for transmitting drive signals to the first and second scanning circuit, wherein the first and second scanning circuits are controlled by the drive signals to select image areas having different linear scanning start positions from each other and then to output multichannel video signals from the image areas.

6 Claims, 6 Drawing Sheets

VERTICAL BLOCK
SELECTION EXAMPLE

| VS4 | VS3 | VS2 | VS1 | BLOCK |
|---|---|---|---|---|
| 0 | 0 | 0 | 0 | START FROM BLOCK B1 |
| 0 | 0 | 0 | 1 | B2 |
| 0 | 0 | 1 | 0 | B3 |
| 0 | 0 | 1 | 1 | B4 |
| 0 | 1 | 0 | 0 | B5 |
| 0 | 1 | 0 | 1 | B6 |
| 0 | 1 | 1 | 0 | B7 |
| 0 | 1 | 1 | 1 | B8 |
| 1 | 0 | 0 | 0 | B9 |
| 1 | 0 | 0 | 1 | B10 |
| 1 | 0 | 1 | 0 | B11 |
| 1 | 0 | 1 | 1 | B12 |
| 1 | 1 | 0 | 0 | B13 |
| 1 | 1 | 0 | 1 | B14 |
| 1 | 1 | 1 | 1 | B15 |

FIG. 6

HORIZONTAL READ-OUT POSITION
SELECTION EXAMPLE

| HS3 | HS2 | HS1 | HORIZONTAL READ-OUT START POSITION |
|---|---|---|---|
| 0 | 0 | 0 | START FROM 1st PICTURE ELEMENT |
| 0 | 0 | 1 | 65th |
| 0 | 1 | 0 | 97th |
| 0 | 1 | 1 | 129th |
| 1 | 0 | 0 | 193rd |

FIG. 7

IMAGE RECORDING APPARATUS CAPABLE OF SELECTING PARTIAL IMAGE AREAS FOR VIDEO READOUT

This application is a continuation of application Ser. No. 08/282507 Aug. 1, 1994 which is a continuation of application Ser. No. 07/915,978 filed Jul. 21, 1992, now abandoned.

BACKGROUND OF THE INVENTION

The present invention relates to an image recording apparatus to be incorporated in a high speed video-system and more particularly is concerned with an image recording apparatus provided with an image device capable of selecting an imaging area and reading out the area with very fast frame feed speed.

An image device such as CCD or MOS-type image device for transducing optical image elements into electric signals is generally utilized for a high speed camera or a high speed system for photographing images and reproducing records. For example, there are provided Japanese Patent Application National Publication Nos. 56-501704 and 57-501309, showing conventional image devices in which an imaging surface is formed by a plurality of two-dimensional arrangements of photoelectric transfer elements such as photodiodes, the imaging surface is divided into a plurality of rectangular blocks along the vertical row direction of the imaging surface for reading out with high speed the images formed on the imaging surface, and quick read-out of frame feed speed can be performed by scanning simultaneously parallelly a plurality of lines of the photoelectric transfer elements respectively arranged in the divided rectangular blocks.

However, the imaging surface of the image device of such prior art to be incorporated in the high speed video-system is divided into a plurality of rectangular blocks along the vertical row direction to thereby realize high speed read-out of the image, but the division of the imaging surface into the rectangular blocks provides a problem of limiting objects shown as imaging areas.

Furthermore, in the prior art image device, since the imaging surface is divided along the vertical row direction, skipping operation in the vertical direction can be relatively easily performed by a simple circuit structure without adversely affecting on number of the frame. However, skipping operation in the horizontal direction requires a high speed circuit structure because a lot of the photoelectric transfer elements and application of high speed pulses, which results in a complicated control thereof, and moreover, a degree of freedom for the selection of the imaging areas is limited and, for this reason, every one of the imaging areas of the respective rectangular blocks can only be selected and it is hence difficult to select other imaging areas.

SUMMARY OF THE INVENTION

An object of the present invention is to substantially eliminate defects or drawbacks encountered in the prior art and to provide an image recording apparatus capable of improving the degree of freedom for selecting image areas of an imaging surface of an image device of the image recording apparatus and of reading out a picture image on the imaging surface with super-high frame feed speed.

This and other objects can be achieved according to the present invention by providing an image recording apparatus in which an imaging surface of an image device is formed so as to store and read out an image by arranging two-dimensionally a plurality of photoelectric transfer elements, the imaging surface is divided along lines into a plurality of blocks, scanning lines are formed in accordance with the photoelectric transfer elements arranged in a horizontal direction of the divided bloccks, respectively, and the plurality of scanning lines of the respective blocks are parallelly linearly scanned to output a multichannel video signals, the image recording apparatus comprising:

a first scanning circuit for setting a plurality of linear scanning direction start positions along the scanning line direction of the blocks and selecting a block to be read out;

a second scanning circuit for selecting the linear scanning start positions and numbers of picture elements to be linearly scanned; and a drive circuit for transmitting drive signals to the first and second scanning circuit, wherein the first and second scanning circuits are controlled by the drive signals to select image areas having different linear scanning start positions from each other and then to output multichannel video signals from the image areas.

In a preferred embodiment, the first scanning circuit comprises a vertical scanning circuit for carrying out vertical scanning and the second scanning circuit comprises a horizontal scanning circuit for carrying out a horizontal scanning. The image recording apparatus may further comprise a clock for transmitting a signal for driving the drive circuit, an amplifier circuit connected to the image device, an analog-to-digital converter connected to the amplifier circuit, and a memory connected to the analog-to-digital convertor, and wherein the drive circuit is operatively connected to the analog-to-digital convertor.

According to the image recording apparatus of the characters described above, the imaging surface of the image device of two-dimensional arrangement is divided into a plurality of blocks along line direction of the imaging surface and a plurality of scanning lines are formed in accordance with the photoelectric transfer elements arranged in the longitudinal direction of the respective blocks. A plurality of line scanning start positions are set along the scanning direction of the blocks. The first scanning circuit selects the block to be read out and the second scanning circuit selects and controls the linear scanning start position and the number of linear scanning picture elements to thereby select predetermined imaging areas having different linear scanning start positions and then to output the multichannel video signals from the selected areas, whereby the selection freedom of the imaging areas can be improved and the super-high speed frame feed speed read-out can be realized.

BRIEF DESCRIPTION OF THE DRAWINGS

For a better understanding of the present invention and to show how the same is carried out, reference is made to, by way of preferred embodiments, to the accompanying drawings, in which:

FIG. 6 is a table showing selection examples of vertical blocks of an image device of FIG. 5; and FIG. 7 is a table showing selection examples of horizontal read-out start positions of the image device of FIG. 5.

DESCRIPTION OF THE PREFERRED EMBODIMENTS

A first embodiment of the image recording apparatus according to the present invention will be described hereunder with reference to FIGS. 1 to 4.

Figure 1:
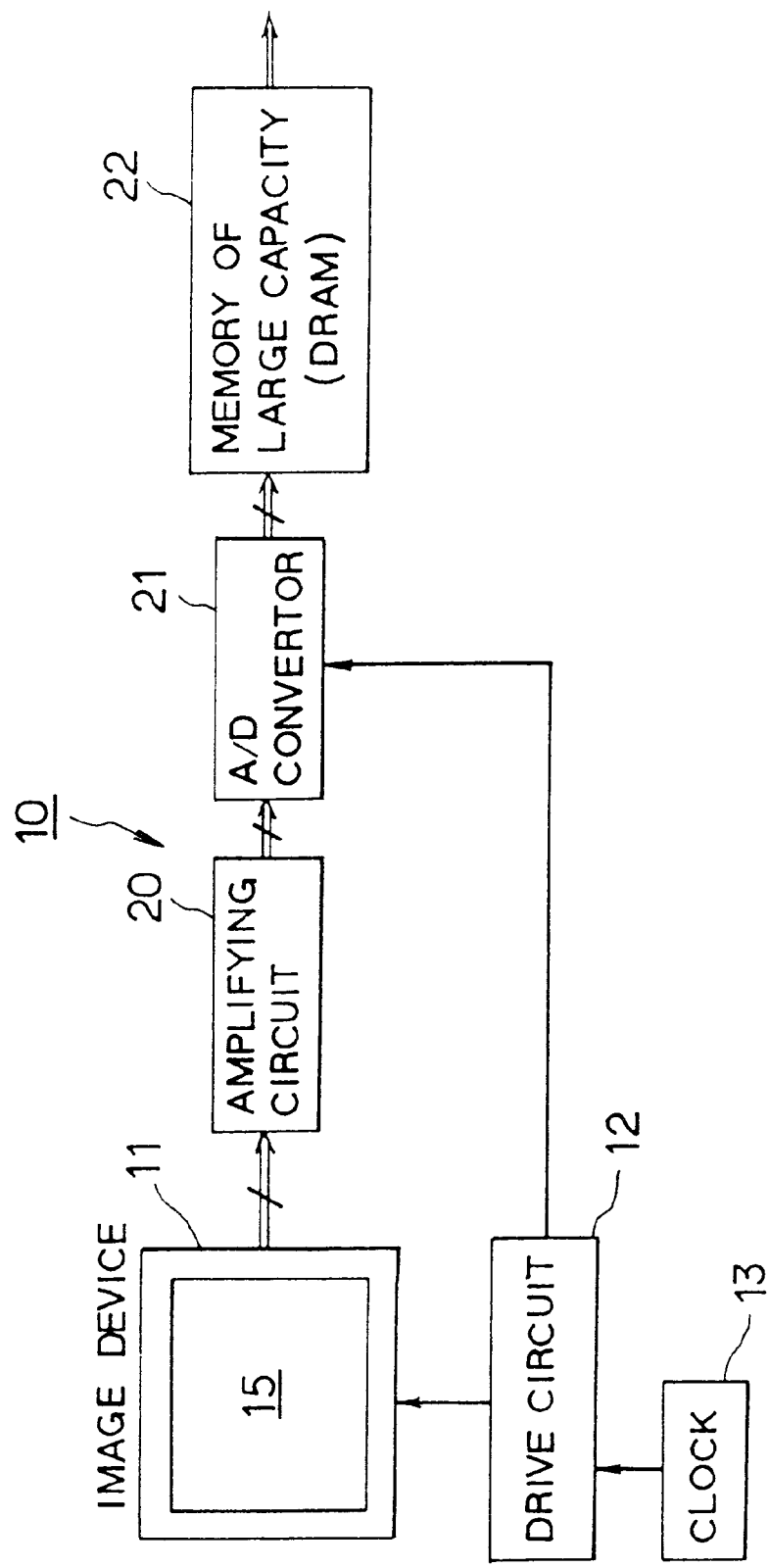
FIG. 1 is a block diagram of an image recording apparatus of a first embodiment according to the present invention.

FIG. 1 shows a block diagram of an image recording apparatus 10 to be incorporated in a high speed video-camera or high speed video-system. The image recording apparatus 10 is provided with an image device or sensor 11 such as CCD or MOS-type image device for transducing optical image elements into electric signal in two-dimensional arrangement capable of storing and reading out images, and the image device 11 is driven by a drive signal from a drive circuit 12 to thereby start the read-out operation. The drive circuit 12 is driven by a clock pulse of 25 MHz, for example, from a clock 13.

Figure 2:
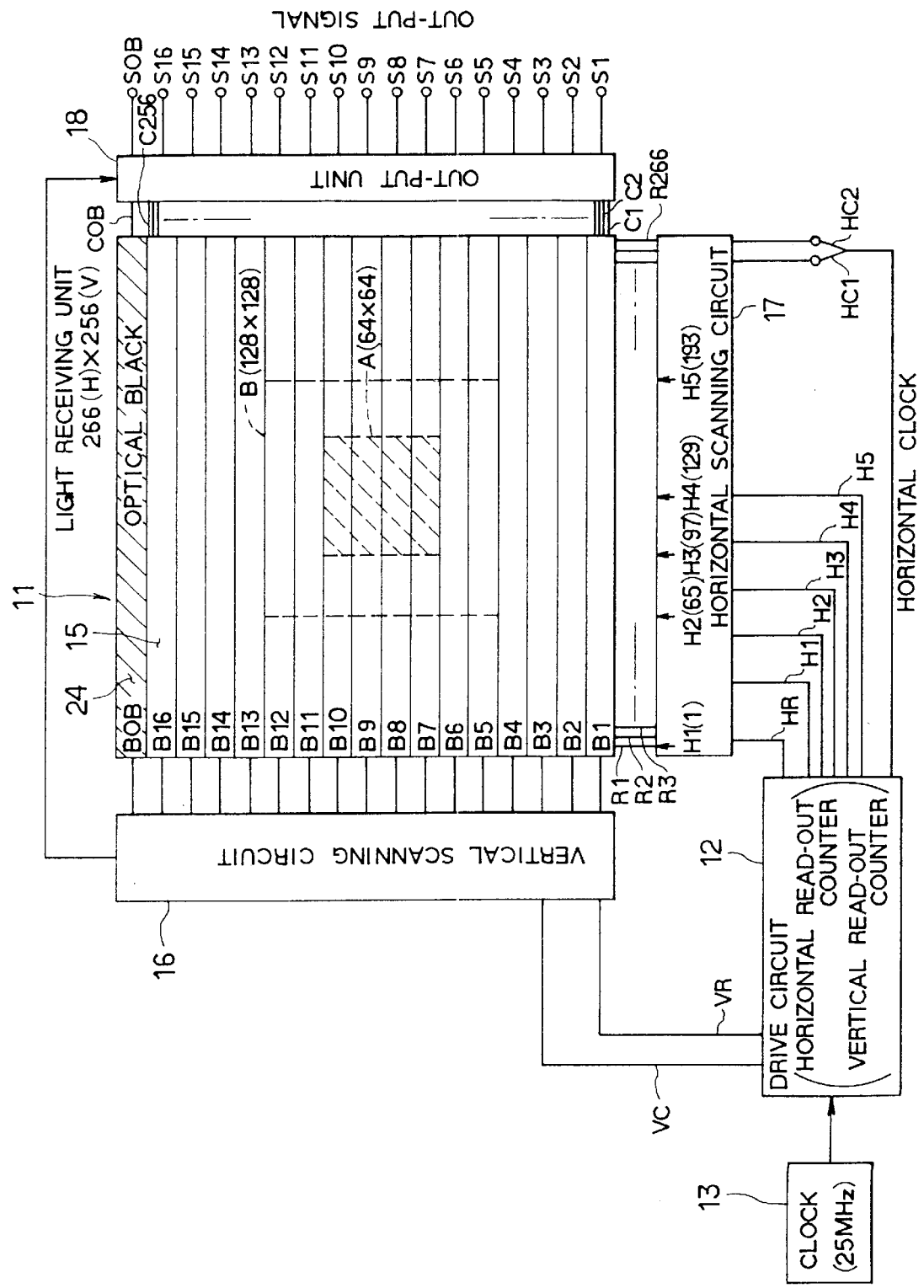
FIG. 2 shows a block of a part of the image recording apparatus of FIG. 1 representing functional layout of the first embodiment.

As shown in FIG. 2, the image device 11 is provided with an imaging surface (light receiving surface) 15 composed of a plurality of photoelectric transfer elements, in two-dimensional arrangemnt, such as photodiodes composed of MOS-type semiconductor elements, a vertical scanning circuit 16 as a first scanning circuit constituting a block selection shift register, a horizontal scanning circuit 17 as a second scanning circuit constituting a line shift register, and an output unit 18 for outputting a multichannel analog video signal in response to the scanning of the imaging surface.

The multichannel analog video signals S1–S16 outputted from the image device 11 are amplified by an amplifier circuit 20, and thereafter, are inputted into an A/D (analog-to-digital) converter 21 in which the analog video signals are converted into digital video-signals. The digital video signals are then recorded continuously in a memory 22 having a large data storage capacity, and the data thus stored in the memory 22 is read out in time series by a read-out memory, not shown, to thereby reproduce the images at a speed lower than the imaging speed.

As shown in FIG. 2, the image device 11 forms the imaging surface 15 in the form of format of the photoelectric transfer elements as imaging elements having two-dimensional arrangement of, for example, two hundred and sixty-six (266) horizontal rows R1, R2, - - - R266 and two hundred and fifty-six (256) vertical lines C1, C2, - - - C256, and the imaging surface 15 is also divided into sixteen blocks B1, B2, - - - B16 along the vertical rows. The respective divided blocks forms sixteen photoelectric transfer element rows along the horizontal direction of the imaging surface 15 and sixteen scanning lines are also constituted by the respective sixteen photoelectric transfer element rows. The sixteen scanning lines of the respective blocks B1, B2, - - - B16 are parallelly scanned in order by the vertical and horizontal scanning circuits 16 and 17, and the analog video signals S1, S2, - - - S16 are then outputted through the output unit 18. The reason, why the number of the horizontal photoelectric transfer elements is larger than that of the vertical photoelectric transfer elements by about 10 numbers, is a countermeasure to provide a margin with respect to noises.

The imaging surface 15 has a plurality of, five, for example, linear scanning start positions H1 (first image element), H2 (sixty-fifth image element), H3 (ninety-seventh image element), H4 (one hundred and twenty-ninth image element), and H5 (one hundred and ninety-third image element).

In FIG. 2, reference numeral 24 denotes an optical black region BOB for setting a reference point (D point) of the A/D converter 21.

Horizontal clock pulses HC1 and HC2 outputted from the drive circuit 12 and inputted into the horizontal scanning circuit 17 are utilized as timing signals for reading out every one picture element when a certain picture element of the horizontal photoelectric transfer elements (266 numbers). When the horizontal read-out is started with any one of the horizontal shift register synchronizing pulses H1, H2, - - - H5, the picture element read-out is performed from this starting time with these horizontal clock pulses HC1 and HC2. These horizontal clock pulses HC1 and HC2 have 12.5 MHz, respectively, but have phases different from each other by 180° and have the horizontal scanning speed of 25 MHz.

The reading-out of the images recorded on the imaging surface 15 of the image device 11 by the image recording apparatus 10 will be described hereunder.

First, when the imaging surface 15 of the image device 11 is fully scanned, the drive circuit 12 is driven by the clock 13 and generates, as drive signals, a vertical reset pulse VR and a vertical shift register clock pulse VC, which are transmitted to the vertical scanning circuit 16 as shown in FIG. 3 to thereby enable and drive the vertical scanning circuit 16. This vertical scanning circuit 16 is reset by the first vertical reset pulse VR and selects the first block B1 by the vertical shift register clock pulse VC, enabling the image scanning operation of the first block B1.

Simultaneously, a horizontal reset pulse HR and a horizontal shift register synchronizing pulse H1 are transmitted from the drive circuit 12 to the horizontal scanning circuit 17 to start the scanning of the first picture element, thus driving the horizontal scanning circuit 17. The horizontal scanning circuit 17 is reset by the horizontal reset pulse HR and the scanning is started sequentially from the first picture element R1 by the first horizontal shift register synchronizing pulse H1.

According to this operation, the picture image recorded on the imaging surface 15 of the image device 11 is scanned parallelly simultaneously along the sixteen scanning lines from the first picture element R1 of the selected first block B1. The analog video signals S1, S2, - - - S16 obtained by this scanning operation are outputted from the output unit 18.

The drive circuit 12 is provided with a horizontal counter for the horizontal scanning operation so that the horizontal reset pulse HR is transmitted to the horizontal scanning circuit 17 at a time of the completion of the horizontal scanning of all the picture elements (256 numbers), the vertical shift register clock pulse VC is then transferred to the vertical scanning circuit 16 to finish the enabling of the operation of the first block B1, and then the scanning is skipped in the vertical direction to thereby select the second block B2 and to enable the operation of the second block B2.

Thereafter, the horizontal shift register synchronizing pulse H1 for the first picture element read-out start is transferred to the horizontal scanning circuit 17 from the drive circuit 12 to thereby start the read-out of the second block B2.

Subsequently, substantially the same operation as that described above is repeated with respect to the respective blocks B3 to B16, and the read-out operations of these blocks can be performed. After the read-out of the final block B16, the vertical reset pulse VR and the vertical shift register clock pulse VC are transferred to the vertical scanning circuit 16 for the treatment of the next picture image on the imaging surface 15. In the next operation, the first blcok B1 is again selected and the operation of this first block B1 is enabled.

The output unit of the image device 11 outputs, to the A/D converter 21, the analog video signals S1, S2, - - - S16 corresponding to the sixteen scanning lines respectively corresponding to the enabled selected blocks B1, B2, - - - B16. The not-enabled and not-selected blocks are affected by the image scanning operation, and electric charges are accumulated in accordance with incident light.

Image treatment operation for selecting and then scanning imaging areas from the imaging surface 15 of the image device 11 will be then described hereunder.

The description is made with reference to a case that a central square section of sixty-four numbers (64) of horizontal picture elements and sixty-four numbers (64) of vertical picture elements are read out.

Figures 3A, 3B:
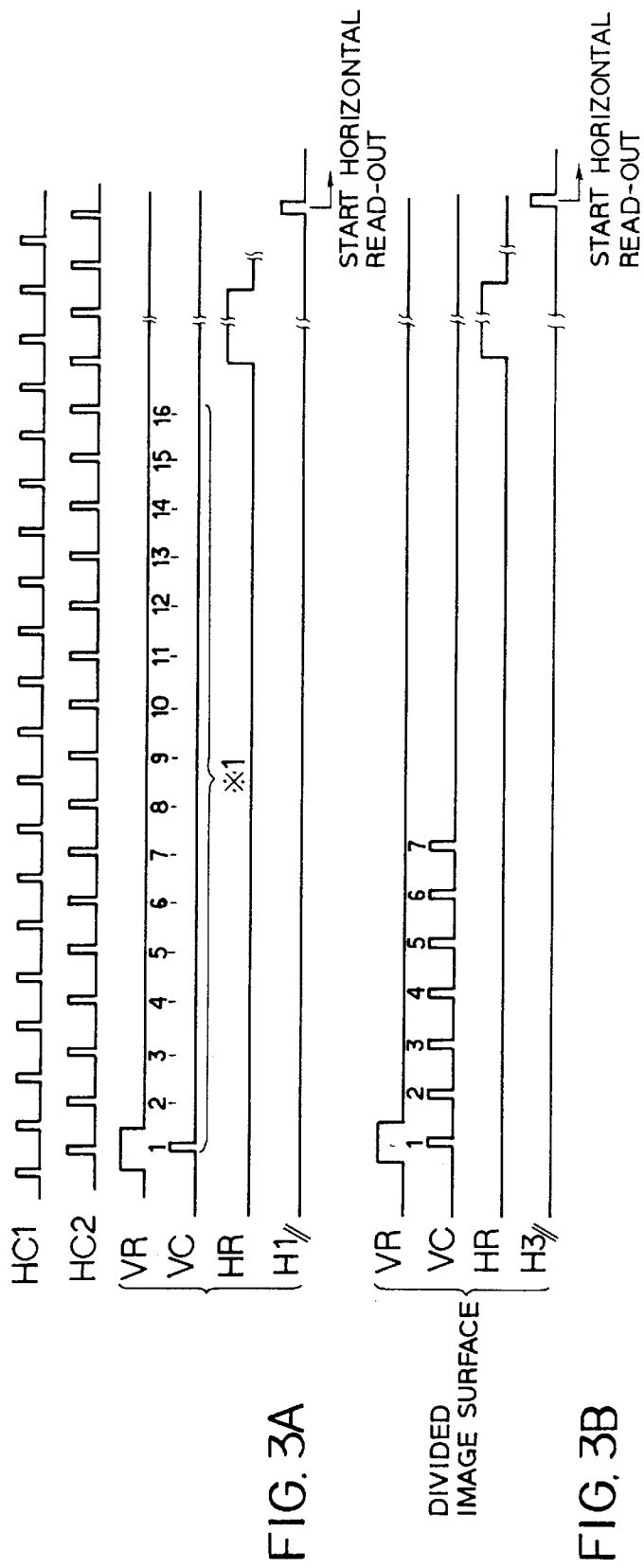
FIGS. 3A and 3B are timing charts at a time of selecting a specific block from divided blocks of an imaging surface of an image device of the image recording apparatus.

The drive circuit 12 is driven by the clock 13 and generates, as a drive signal, the vertical reset pulse VR to the vertical scanning circuit 16, which is reset by this vertical reset pulse VR. Next, as shown in FIG. 3B, the drive circuit 12 sequentially generates seven (7) vertical shift register clock pulses to the vertical scanning circuit 16 to thereby select the seventh block B7, enabling the operation of the selected seventh block B7.

Under the operation enabled condition of the seventh block B7, the drive circuit 12 generares drive signals, as adress signals, to the horizontal scanning circuit 17, the horizontal reset pulse HR and the horizontal shift register synchronizing pulse H3 for starting the scanning of the ninety-seventh (97) picture element. The horizontal scanning circuit 17 is thus reset by the horizontal reset pulse HR and the scanning is started from the ninety-seventh picture element in response to the horizontal shift register synchronizing pulse H3.

The horizontal scanning operation by means of the horizontal scanning circuit 17 is counted by the horizontal counter for the horizontal scanning in association with the drive circuit 12, and the drive circuit 12 generates the horizontal reset pulse HR to the horizontal scanning circuit 17 to stop and then reset the horizontal scanning by timing the completion of the horizontal scanning by the amount of sixty-four picture elements. Meanwhile, the vertical shift register clock pulse VC is transferred to the vertical scanning circuit 16 from the drive circuit 12 to thereby finish the enabling of the operation of the block B7, and the operation is then skipped to select the eighth block B8, enabling the operation of the eighth block B8.

Thereafter, the horizontal shift register synchronizing pulse H3 for starting the scanning of the ninety-seventh picture element is transferred to the vertical scanning circuit 16 to read out the selected eighth block B8. These operations are repeated for the succeeding operations, and at the time of the completion of the read-out of the block B10 by a vertical counter for the vertical scanning provided for the drive circuit 12, the vertical reset pulse VR and the subsequent vertical shift register clock pulses VC (by seven clocks) are transferred to the vertical scanning circuit 16 for the read-out of the next imaging area A, and the scanning of the next block is started.

The imaging areas can be selected in accordance with the sequential manner for transferring vertical shift register clock pulses VC from the drive circuit 12 and the number of combination of the horizontal shift register synchronizing pulses H1, H2, H3, H4 and H5. The imaging areas can be selected from the various areas other than the areas A and B shown in FIG. 2, thus improving the selection freedom of the imaging areas.

As described above, the drive circuit 12 is provided with the horizontal and vertical counters respectively for the horizontal and vertical scannings, whereby the setting of the whole imaging surface, the starting positions and the numbers of the picture elements of the horizontal picture element of the imaging area (divided picture), the starting positions of the vertical blocks B1 to B16, and the setting of the numbers of the blocks, can be performed. Further, in the scanning time of the whole picture surface, the time lag from the picture image dividing time on the scanning can be neglected by giving a margin by the time amount corresponding to the maximum pulse as shown in FIG. 3A to the vertical shift register clock pulse VC which is transferred from the drive circuit 12 to the vertical scanning circuit 16.

The read-out data speed of the image recording apparatus 10 is for example of about 25 MHz, by which frame feed speed is obtained as shown in the following table 1.

TABLE 1

| Scanning Mode | Horizontal Picture Elements | * | Vertical Picture Elements | Frame Feed Speed (N/sec) |
|---|---|---|---|---|
| Whole Surface | 256 | * | 256 | 4500 |
| Divided Surface (1) | 256 | * | 128 | 9000 |
| Divided Surface (2) | 256 | * | 64 | 18000 |
| Divided Surface (3) | 128 | * | 128 | 13000 |
| Divided Surface (4) | 128 | * | 64 | 27000 |
| Divided Surface (5) | 64 | * | 64 | 40500 |

Figure 4A:
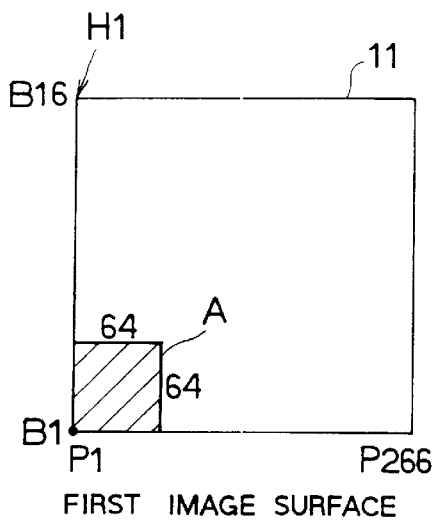
FIGS. 4A, 4B and 4C are views in which image area read-out start positions are changed with respect to one image surface.
Figure 4B:
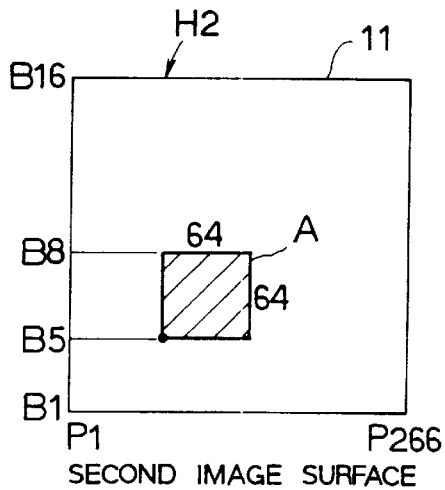
Figure 4C:
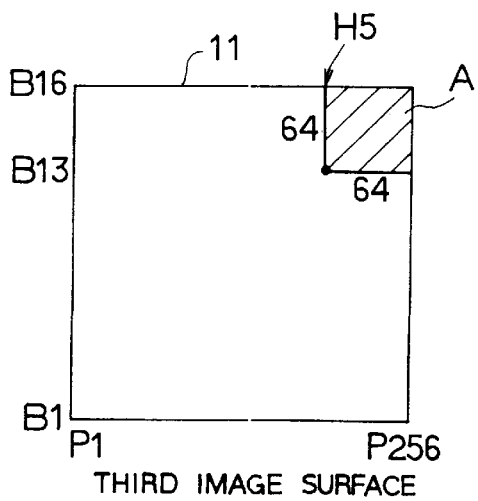

The image read-out area can be changed in its read-out starting position with every completion of the treatment of one image picture. FIGS. 4A, 4B and 4C shows examples of cases in which the read-out starting positions are changed to one picture image of 64*64 picture elements. In these cases, the frame feed speed becomes the high speed of 1/40500 sec., thus enabling super-high speed treatment.

As described above, one portion of the whole image surface can be read out by changing the read-out starting positions after completion of the treatment of each image while following the movement of an object to be imaged.

Another embodiment of the image recording apparatus according to the present invention will be described hereunder with reference to FIGS. 5 to 7.

Figure 5:
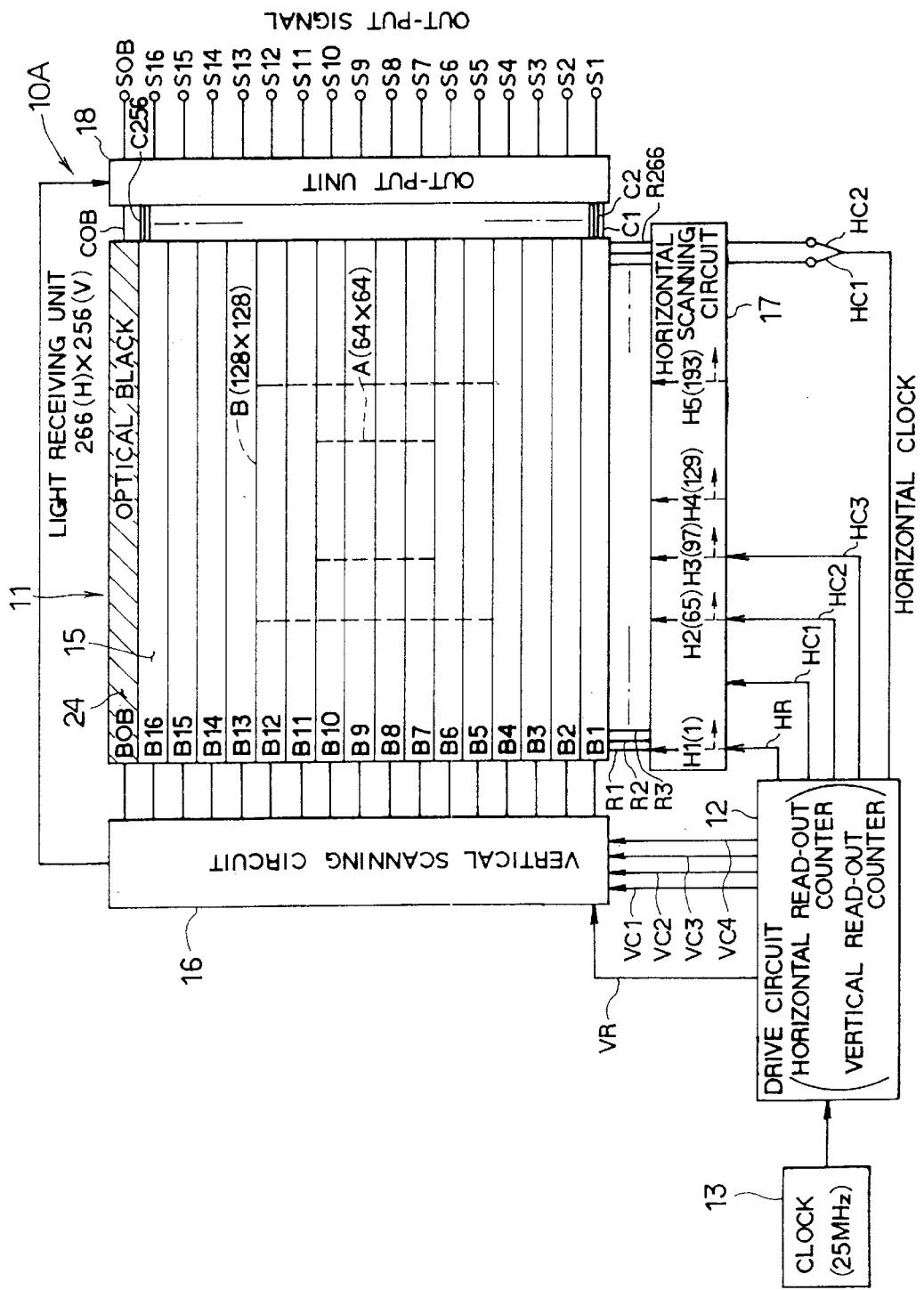
FIG. 5 is a block similar to that of FIG. 2 but related to a second embodiment according to the present invention.

An image recording apparatus 10A of this embodiment is basically different from the image recording apparatus 10 of FIG. 2 with reference to the drive signal from the drive circuit 12 to the vertical scanning circuit 16 and the horizontal scanning circuit 17, but otherwise the construction is not different from that of the first embodiment, and accordingly, in FIGS. 5 to 7, like reference numerals are added to elements or portions corresponding to those of the first embodiment of FIGS. 1 to 4.

In this embodiment of FIG. 5, vertical shift register signals VC1 to VC4, as shown in FIG. 5, are transferred as drive signals from the drive circuit 12 to the vertical scanning circuit 16 to thereby select the blocks B1 to B16. Simultaneously, horizontal shift register synchronizing signals HC1 to HC3, as shown in FIG. 7, are transferred from the drive circuit 12 to the horizontal scanning circuit 17 to thereby select the horizontal read-out start position from H1

(first picture element), H2 (sixty-fifth picture element), H3 (ninety-seventh picture element), H4 (one hundred and twenty-ninth picture element) and H5 (one hundred ninety-third picture element).

In the described embodiments, the imaging surface of the image device is divided into sixteen blocks and five horizontal read-out start positions (i.e. linear scanning start positions) are set to the horizontal scanning circuit, but the numbers of the blocks and start positions are not limited to those numbers and may be optionally selected as occasion demands.

What is claimed is:

1. An image recording apparatus for storing and reading out an image, comprising:

an image device having an imaging surface in which a plurality of photoelectric transfer elements are arranged in a plurality of vertical rows and a plurality of horizontal rows, the horizontal rows being divided into a plurality of adjacent blocks so that the respective horizontal rows included in the respective blocks constitute horizontal scanning lines;

means for sequentially selecting one of the blocks to be scanned by shifting operation, the sequentially selecting means consisting essentially of a single block select shift register;

scan start positions previously and fixedly set to the photoelectric transfer elements of the respective horizontal rows of the respective blocks along a direction of the scanning lines of the respective blocks for determining scan start elements of the readout image in the respective horizontal rows, the scan start positions being fewer in number than that of the photoelectric transfer elements in the respective horizontal rows of the respective blocks;

means for selecting one of the scan start positions and for setting a number of the transfer elements in the horizontal rows to be sequentially scanned along the scanning lines from the selected scan start position, the selecting and setting means consisting essentially of a single line select shift register, the number of transfer elements being previously set according to the scan start positions;

a vertical drive circuit for transmitting a vertical drive pulse to the single block shift register to control the sequential selection of the one of the blocks;

a horizontal drive circuit for selecting a single horizontal shift register synchronizing pulse from horizontal shift register synchronizing pulses corresponding to the previously and fixedly set scan start positions to transmit the single horizontal shift register synchronizing pulse to the single line select shift register in order to determine one of the scan start positions and to control the sequential scanning of the transfer elements in the respective horizontal rows included in the selected block so that the transfer elements in the respective horizontal rows of the selected block are simultaneously scanned from the selected scan start position by the number of transfer elements set by the single line select shift register; and means for simultaneously outputting video signals according to the simultaneously scanned transfer elements in the respective rows of the selected block.

2. An image recording apparatus according to claim 1, further comprising a clock means for transmitting a signal for driving the vertical and the horizontal drive circuits.

3. An image recording apparatus according to claim 2, further comprising an amplifying circuit operatively connected to the image device, an analog-to-digital converter connected to the amplifying circuit and memory means connected to the analog-to-digital converter, and wherein the vertical and the horizontal drive circuits are operatively connected to the analog-to-digital converter.

4. An image recording apparatus according to claim 1, including at least 256 vertical rows and at least 266 horizontal rows, and wherein said scan start positions comprise a first scan start position, a second scan start position, a third scan start position, a fourth scan start position, and a fifth scan start position, said first scan start position being set to a first photoelectric transfer element in the respective rows of the respective blocks, said second scan start position being set to a sixty-fifth photoelectric transfer element, said third scan start position being set to a ninety-seventh photoelectric transfer element, said fourth scan start position being set to a one hundred and twenty-ninth photoelectric transfer element, and said fifth scan start position being set to a one hundred and ninety third photoelectric transfer element.

5. An image recording apparatus according to claim 4, wherein, when the horizontal drive circuit selects the single horizontal shift register synchronizing pulse corresponding to the third scan start position, the single line select shift register selects the third scan start position from the scan start positions according to the single horizontal shift register synchronizing pulse and sets the number of the transfer elements in the horizontal rows to 64.

6. An image recording apparatus according to claim 4, wherein the vertical drive circuit includes vertical counter means adapted to detect whether or not all the blocks sequentially selected by the single block select shift register are scanned and horizontal counter means adapted to count the number of the elements in the respective horizontal rows of the selected block to be scanned, and wherein the single line select shift register is adapted to finish the scan of the elements in the respective horizontal rows of the selected block according to a result of the count of the horizontal counter means and wherein the single block select shift register is adapted to shift the selection of the blocks to be scanned.

* * * * *